United States Patent
Steiner et al.

(10) Patent No.: US 12,454,092 B2
(45) Date of Patent: Oct. 28, 2025

(54) METHOD AND APPARATUS FOR FORMING PLASTIC PREFORMS FOR PLASTIC CONTAINERS WITH CURVE EVALUATION

(71) Applicant: KRONES AG, Neutraubling (DE)

(72) Inventors: Andreas Steiner, Wenzenbach (DE); Thomas Gerstenberg, Regensburg (DE); Philipp Olenberg, Regensburg (DE); Simon Fischer, Regensburg (DE); Sebastian Kirchmayer, Geiselhoering (DE)

(73) Assignee: KRONES AG, Neutraubling (DE)

( * ) Notice: Subject to any disclaimer, the term of this patent is extended or adjusted under 35 U.S.C. 154(b) by 122 days.

(21) Appl. No.: 17/949,192

(22) Filed: Sep. 20, 2022

(65) Prior Publication Data

US 2023/0138489 A1 May 4, 2023

(30) Foreign Application Priority Data

Oct. 28, 2021 (DE) .................... 10 2021 128 204.7

(51) Int. Cl.
*B29C 49/10* (2006.01)
*B29C 49/32* (2006.01)
(Continued)

(52) U.S. Cl.
CPC ............ *B29C 49/32* (2013.01); *B29C 49/122* (2022.05); *B29C 2049/7831* (2022.05);
(Continued)

(58) Field of Classification Search
CPC ..... B29C 49/123; B29C 49/122; B29C 49/36; B29C 49/42362; B29C 2049/7832;
(Continued)

(56) References Cited

U.S. PATENT DOCUMENTS

| 4,372,735 A | 2/1983 | Collette | ................. B29C 17/07 |
| 9,669,577 B2 * | 6/2017 | Schmid | ................. B29C 49/16 |

(Continued)

FOREIGN PATENT DOCUMENTS

| CN | 106573407 A | 4/2017 |
| CN | 111432998 A | 7/2020 |

(Continued)

OTHER PUBLICATIONS

Extended European Search Report issued in Serial No. 22204105.5-1014, dated Apr. 5, 2023, with English translation, 11 pages.

(Continued)

*Primary Examiner* — James Sanders
(74) *Attorney, Agent, or Firm* — HAYES SOLOWAY P.C.

(57) ABSTRACT

Method for forming plastic preforms into plastic containers, wherein a plastic preform is introduced into a blow mould and is expanded into a plastic container by being applied by a flowable medium, wherein the plastic preform is applied by at least two different pressure levels and wherein furthermore preferably a rod-like body is introduced into the plastic preform, in order to expand the plastic preform in its longitudinal direction, wherein a pressure curve and/or a movement curve of the rod-like body being determined by a measuring device during the expansion process, wherein least one of the curves is evaluated by means of a processor device and at least one point or region of this curve which is characteristic of the course is determined.

13 Claims, 8 Drawing Sheets

(51) Int. Cl.
  *B29C 49/78* (2006.01)
  *B29L 31/00* (2006.01)
(52) U.S. Cl.
  CPC ............... *B29C 2049/7832* (2022.05); *B29C 2049/78805* (2022.05); *B29L 2031/712* (2013.01)
(58) Field of Classification Search
  CPC .. B29C 2049/7831; B29C 2049/78805; B29C 2049/7879
  See application file for complete search history.

(56) References Cited

U.S. PATENT DOCUMENTS

| 2012/0326345 | A1 | 12/2012 | Gendre et al. | |
|---|---|---|---|---|
| 2015/0190959 | A1 | 7/2015 | Deau et al. | |
| 2015/0321412 | A1* | 11/2015 | Deau | G05B 19/18 700/197 |
| 2016/0325485 | A1 | 11/2016 | Gendre et al. | B29C 49/79 |
| 2017/0203495 | A1 | 7/2017 | Derrien | |
| 2019/0315038 | A1 | 10/2019 | Hintermeier et al. | B29C 49/06 |
| 2021/0187815 | A1 | 6/2021 | Zimmering et al. | B29C 49/786 |
| 2022/0152911 | A1* | 5/2022 | Schmidt | B29C 49/78 |

FOREIGN PATENT DOCUMENTS

| WO | 2013178903 A1 | 12/2013 | |
|---|---|---|---|
| WO | WO 2019101743 | 5/2019 | ............. B29C 49/12 |
| WO | WO-2020193236 A1 * | 10/2020 | ......... B29C 49/4289 |

OTHER PUBLICATIONS

German Search Report issued in German Patent Appln. Serial No. 10 2021 128 204.7, dated May 12, 2022, with machine English translation, 8 pages.

First Office Action issued in Chinese Patent Appln. Serial No. 202211339884. dated Aug. 30, 2024, with English translation, 17 pages.

* cited by examiner

METHOD AND APPARATUS FOR FORMING PLASTIC PREFORMS FOR PLASTIC CONTAINERS WITH CURVE EVALUATION

BACKGROUND OF THE INVENTION

The present invention relates to a method and apparatus for forming plastic preforms into plastic containers. Such methods and apparatus have been known in the prior art for a long time. In this process, heated plastic preforms are fed into blow moulds and expanded or inflated into containers by means of compressed air or also directly by means of the liquid product.

A large number of parameters are set or controlled for this process. For example, the blowing pressures with which the plastic preform is expanded are regulated and/or controlled, as well as a stretching bar movement which expands the containers in their longitudinal direction. Overall, the process of this expansion is relatively complex.

For this reason, there has been a recent trend towards recording and evaluating corresponding measurement curves, for example measurement curves of the pressure conditions, stretching bar movement or also the stretching force, in order to gain more precise knowledge about the blow moulding process. Such methods are known from the applicant's internal prior art. However, the problem arises here that a very large amount of data has to be recorded, for example a complete measurement curve of the blowing pressure and/or the stretching bar movement over a blowing process. These very large amounts of data can no longer be processed well in practice and, in particular, can hardly be stored or transmitted.

The present invention is therefore based on the object of carrying out such an evaluation while reducing the amount of data to be evaluated and/or stored. According to the invention, this object is achieved by the subject matters of the independent patent claims.

SUMMARY OF THE INVENTION

In a method according to the invention for forming plastic preforms into plastic containers, a plastic preform is introduced into a blow mould and expanded into a plastic container by the application of a flowable and, in particular, gaseous medium. In the method, at least two different pressure levels are applied to the plastic preform and, furthermore, a rod-like body is preferably introduced into the plastic preform in order to expand the plastic preform in its longitudinal direction. Furthermore, a pressure curve and/or a movement curve of the rod-like body and/or a force curve, for example of the drive device, of the rod-like body is determined by means of at least one measuring device during the expansion process.

According to the invention, at least one of the curves is evaluated by means of a processor device and at least one point or characteristic range of this curve that is characteristic of the course is determined.

It is therefore proposed within the scope of the invention that not the complete pressure curve is further utilised, but only certain characteristic areas and in particular points of this pressure curve, as mentioned in more detail below, for example extreme values or turning points. The applicant has found that in order to assess a pressure curve, it is not the entire area that is decisive, but characteristic points of it.

Thus, the invention proposes to perform an evaluation or analysis of this curve and to ultimately store and/or evaluate only certain areas.

Preferably, these characteristic points are assigned or can be assigned to specific processes occurring during expansion.

Preferably, distinctive process points are determined by means of a mathematical evaluation of the recorded blowing curves or pressure curves or movement curves (pressure, stretching path, stretching force, process time, valve switching points and/or machine angle). These distinctive process points can be used for the purpose of process control or also predictive maintenance and the derivation of dependencies in the process.

For example, a certain number of process points can be defined. Advantageously, the number of process points is greater than three, preferably greater than four, preferably greater than five, preferably greater than seven and particularly preferably greater than ten. In a further preferred method, the number of these process points is less than 50, preferably less than 40, preferably less than 30 and preferably less than 25.

One advantage of this approach is that no changes have to be made to the respective machine, but at most software adjustments. The amount of data required is reduced many times over compared to saving the raw data. The selected process data points can be further used for a later machine setting and/or also for other machines at other locations. This is possible, for example, by storing the data in a cloud.

Preferably, the pressure curve and/or the movement curve is recorded as a function of time and/or as a function of the position of a forming station or the location of the plastic preform to be expanded.

Particularly preferably, the plastic preforms are expanded with a plurality of forming stations. Particularly preferably, these forming stations are arranged on a movable and, in particular, rotatable carrier. Particularly preferably, the pressure curves or movement curves described here are recorded for each of the individual stations. Particularly preferably, the evaluation is carried out in relation to the individual forming station, so that preferably certain measurement curves (and/or the process points derived therefrom) can also be assigned to individual forming stations.

Preferably, the blow curve recording and the blow curve evaluation are carried out in a control device of the blow module or the forming device, i.e. in the so-called SBC (Control stretch blow moulding sequence). Therefore, there are preferably no control devices at the individual forming stations, but only decentralised peripherals that do not record (blow) curve progressions.

However, it would also be advantageous for the blowing curve recording and evaluation to be carried out directly at the forming stations and therefore, unlike described above, not in the SBC.

In a preferred method, this characteristic point or area is selected from a group of points or areas which contains extremes or extreme areas, i.e. minimum or maximum areas of the pressure curve and/or the movement curves, turning points or turning point areas of the pressure curve or movement curve and the like. In addition, points of a measurement curve can also be determined in which a slope is maximum and/or minimum, i.e. extremes of a mathematical derivative of the curves.

The applicant has found that special conclusions can be drawn, for example about a local pressure maximum or pressure minimum, at such areas where, for example, maxima or minima or also turning points occur. This can, for example, be decisive for or indicate that the expanded container begins to adhere to the wall of the blow mould during the expansion process. The point in time at which the plastic preform begins to expand when applied with compressed air can also be recognised as a characteristic measuring point of the measuring curve, in particular as a local maximum of the pressure curve.

But also the movement curves of the stretching bar show such characteristic points, as shown in more detail below. In this case, the actual position curve of the stretching bar preferably hardly changes between the stretch blowing processes and also only deviates slightly from the nominal curve, which is already fixed from the outset and does not have to be recorded first, so that the nominal curve can preferably also be used at this point. Instead of the position curve, a speed curve can preferably also be used. Since the speed curve is the derivative of the position curve, it would then not be necessary to determine a difference quotient. Preferably, an evaluation of a stretching force curve would also be conceivable at this point.

In a further preferred method, the plastic preform or preforms are transported along a pre-determined transport path during their expansion. Advantageously, this is a circular or circular segment path. Particularly preferably, the plastic preforms are transported by means of a blowing wheel. Particularly preferably, the plastic preforms are expanded against a blow mould and/or an inner wall of a blow mould.

In a further preferred method, the curve is recorded as a function of time and/or as a function of a position of the plastic preform. For example, the entire expansion process can be observed in a time or a period of time, or as a function of a position of the respective forming station during a rotation of the blowing wheel.

In a preferred method, mathematical methods are used to determine the process points from the pressure curves, which are, in particular, corresponding turning points, maxima or minima of the pressure curve or the movement curve. For this purpose, as mentioned above, mathematical methods known from the state of the art are preferably used. Preferably, such extremes or turning points are assigned to specific processes of the blow moulding operation.

In a further preferred method, the pressure curve and/or the movement curve is evaluated by means of a curve discussion and/or mathematical curve discussion methods. In a preferred method, difference quotients are formed, in particular in order to conclude extremes and turning points. In a further preferred method, smoothing procedures are performed and/or applied to the resulting pressure course curves or movement curves. In a preferred method, smoothing is first performed on at least one of the curves. Preferably, mathematical methods for extreme value determination and turning point determination are then carried out.

In a further preferred method, threshold value calculation methods are performed. In a further preferred method, mathematical methods are used for extreme value determination and turning point determination, and in particular methods selected from a group of methods including the h-method, the Newton method, the mean value theorem and the like.

In a further preferred method, a plurality of plastic preforms are formed into the plastic containers by means of a plurality of forming stations and at least one characteristic point and preferably a plurality of characteristic points and/or areas are determined for each of these forming stations.

Preferably, a plurality of curves are recorded for each forming station. The above-mentioned process points can be determined from these curves. It would be possible to carry out averaging over these process points in the further process. It would also be possible to observe a change in the positions of these process points over a longer period of time.

The term curves refers to the pressure curves on the one hand and the movement curves of the stretching bar on the other hand.

These characteristic points or ranges are therefore determined and/or evaluated for all measurement curves. Particularly preferably, each forming station is controlled individually taking these values and ranges into account. Thus, switching points for valves are preferably controlled or the drives of the stretching bars are controlled taking these points into account.

For example, a time control of the forming station, e.g. of the individual valves that control the blow moulding process, can be carried out. However, it would also be possible to control the forming station depending on a rotation angle or position.

In a preferred method, n-tuples are formed from several characteristic points (in particular of a specific forming station) and these n-tuples are preferably stored in a storage device and/or a cloud. For example, five different measurement points can be stored for a measurement curve, in particular with a temporal assignment and/or an assignment to a position of the relevant forming station. Furthermore, this n-tuple can be assigned a value that is characteristic for the particular forming station. These n-tuples take up considerably less storage capacity than a complete measurement curve and are correspondingly easier to transmit. The variable n is a natural number between 1 and 50, preferably between 2 and 50, preferably between 3 and 40 and preferably between 4 and 30.

In a preferred method, the pressurisation of the containers is controlled by means of at least one controllable valve device and preferably this valve device is controlled taking into account the determined points and/or areas. Preferably, blowing parameters are generally controlled and/or changed on the basis of these values. Preferably, several valve devices of a forming station are controlled according to the determined points. Preferably, the controllable valve device is a proportional valve.

In a further preferred method, data are linked to each process point or process area. As mentioned above, this can be data that allow a conclusion to be drawn about the relevant forming station or also a conclusion to be drawn about the corresponding blowing parameters used.

Preferably, the characterising data are selected from a group of data including a validity of the point, a time at which the point was recorded, a pressure at this process point, a position of the stretching bar at this process point, a force of a driving device of a stretching bar at this process point and/or a delay time of a valve control.

Preferably, all of these values are taken into account. For example, a 5-tuple of values is recorded, from the values validity time, pressure, stretching bar position and delay time (at the process point in question).

In a further preferred method, an evaluation of the points or areas is recorded or carried out. Different causes can be given or determined, such as a switching delay, a composition of the plastic preforms or the like.

In a further preferred method, artificial intelligence is used to evaluate the areas. Thus, it is possible that large amounts of data are recorded, for example, a large amount of data is also recorded for a specific forming station and this amount of data is stored and based on an evaluation of this amount of data, the corresponding forming station is evaluated. In this way, a future behaviour of a respective forming station can be predicted on the basis of these values.

The present invention is further directed to an apparatus for forming plastic preforms into plastic containers, which comprises at least one forming station, which preferably comprises a blow mould, into which the plastic preform can be introduced, and an application device, which applies the plastic preform with a flowable and in particular gaseous medium, wherein the plastic preform is applied with at least two different pressure levels and wherein the apparatus further preferably comprises a rod-like body (in particular a so-called stretching bar) which can be introduced into the plastic preform in order to stretch the plastic preform in its longitudinal direction. Furthermore, a pressure curve and/or a movement curve of the rod-like body and/or a force curve, for example of a drive device, of the rod-like body are determined by means of a measuring device during the expansion process. Preferably, therefore, a measuring device and preferably a pressure measuring device is associated with the forming station and preferably with each forming station. Preferably, the movement curve can also be determined without separate measuring devices (e.g. pressure measuring device), wherein in particular the target profile can also be used instead of a recording.

According to the invention, the apparatus has a processor device which is suitable and intended for evaluating at least one of these curves and for determining at least one point or region of this curve which is characteristic for the course.

Preferably, the forming station comprises a moving device, preferably an electric motor, to move the stretching bar. In a preferred embodiment, at least one and preferably all of the forming stations each have position detection devices for determining a position of the rod-like bodies (which are preferably movable in the longitudinal direction of the plastic pre-forms).

In a further preferred embodiment, the apparatus has a transport device which transports the plastic preforms during their expansion. Particularly preferably, this is a so-called blowing wheel, on which at least one and preferably a plurality of forming stations are arranged. Particularly preferably, these forming stations here each have blow moulds that can be opened and closed. In the further preferred embodiment, these forming stations each have a stretching bar which can be inserted into the plastic preforms in order to stretch them in their longitudinal direction.

Preferably, the apparatus comprises a position detection device which is suitable and intended to detect a position of the forming station. Preferably, the device comprises a time detection device and/or a timer device to detect the (relative or absolute) times of characteristic points or process points.

In a further preferred embodiment, each forming station comprises at least one valve device and preferably a plurality of valve devices. Preferably, the apparatus also comprises a storage device for storing compressed air, wherein this storage device being in particular an annular channel and in particular an annular channel mounted on the blowing wheel.

In a further advantageous embodiment, the apparatus comprises a storage device and/or a cloud which is suitable and intended for storing a plurality of characteristic points, in particular together with data characteristic of these.

In the further preferred embodiment, the apparatus has a plurality of forming stations. Preferably, at least one measuring device is associated with each of these forming stations and in particular a pressure measuring device.

Preferably, the process points can also be assigned to the individual forming stations. Preferably, an evaluation device is also provided which evaluates point tuples and, particularly preferably, also a control device which controls the forming stations and, for example, the above-mentioned valves of the forming stations and/or the drive devices of the rod-like bodies accordingly.

In a further preferred method, the blowing pressure curve (or pressure curve) and/or the movement (course) curve is first evaluated by means of at least one evaluation method and preferably by means of different evaluation methods and the associated parameters. In a further step, defined points or areas (POI, point of interest) are determined.

In a further method step, the points mentioned are transferred to a file management system. In a preferred method, a downstream evaluation of the recorded data is carried out. It is possible to check individual points with regard to their relevance and/or plausibility.

Preferably, the relevant points with regard to the blowing pressure curve are selected from a group of points which include the beginning of the first blowing pressure, a turning point of the pressure curve during the application of the first blowing pressure, a second turning point of the pressure curve which is characteristic, for example, of the material of the pre-form being applied to the front wall of the blow mould, a beginning of a PI pressure (first intermediate blowing), a beginning of a PI+ pressure (second intermediate blowing), a start of the application of the P2 pressure, the maximum P2 pressure, the end of the application of the P2 pressure, the end of the HPZ [high pressure zone], the start of the recycling of the PI+ pressure, the start of the recycling of the PI pressure, the start of the recycling of the P1 pressure, the start of an external recycling, the start of an exhaust (depressurisation) and, if necessary, an end of the exhaust.

With regard to the movement of the stretching bar, several points can also be defined. For example, a point can be defined at which the stretching bar begins to move downwards. Furthermore, a point can be defined at which the stretching bar begins to contact the plastic preform. Furthermore, a point can be defined at which the stretching bar starts to touch the bottom of the blow mould. Furthermore, a point can be defined at which the stretching bar moves upwards again. Finally, a point can be defined at which the stretching bar has reached its upper position again.

As mentioned, it is preferred to search for process points by forming difference quotients. For example, a derivative can be formed by means of difference quotients.

Furthermore, smoothing can be done by forming a median over n-values, for example over 6-values.

Preferably, comparative values are also calculated by means of braces (S-brace).

In doing so, an exceeding of a threshold or S-threshold (with valve switching time Up +40× time unit (for example 1.6 ms)) can be determined.

Preferably, a point or area is then selected with half of this formed brace.

Preferably, the process time, the pressure, the stretching bar position and the switching time delay as the difference between the control and the process time can then be determined behind the array number.

BRIEF DESCRIPTION OF THE DRAWINGS

Further advantages and embodiments can be seen in the attached figures.

In the drawings.

DETAILED DESCRIPTION OF THE INVENTION

Figure 1:
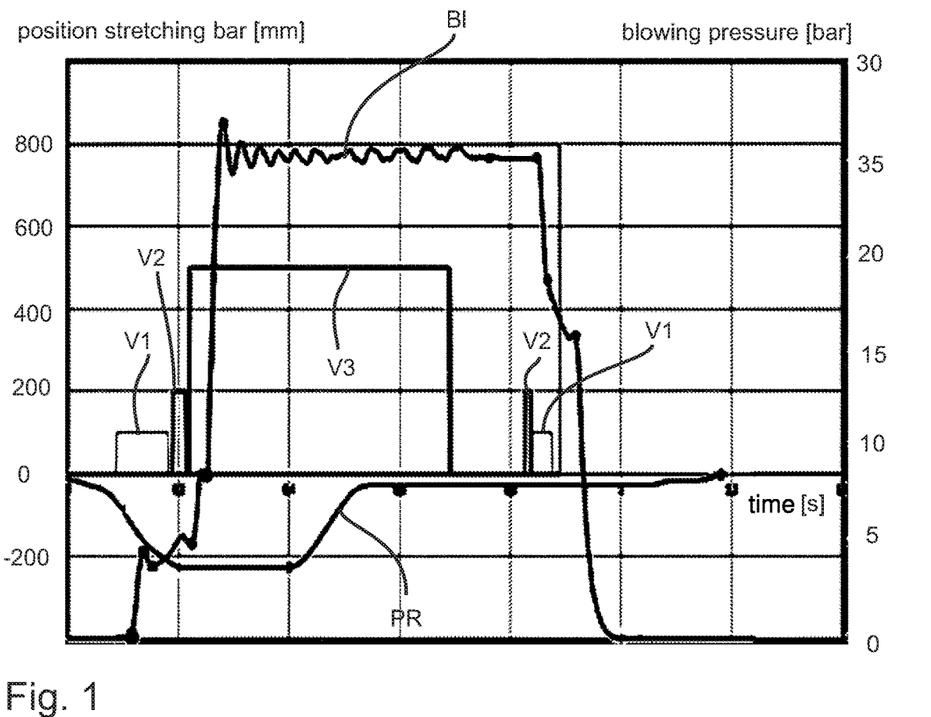
FIG. 1 shows an overall representation of a pressure curve and a stretching bar curve.

FIG. 1 shows a representation of several measurement curves. The reference sign BL refers to a (blowing) pressure curve. The left coordinate shows the position of the stretching bar in millimetres and the right coordinate shows the blowing pressure in bar. The time in seconds is plotted on the ordinate.

The reference sign PR indicates a position of the stretching bar or the above-mentioned movement curve. The reference signs V1 to V3 indicate the switching positions of three (blow) valves. The left two reference signs V1, V2 indicate the opening of the valves for application of the preform with compressed air and the right two reference signs V1, V2 indicate the opening of the valves for the purpose of recycling (of blowing air).

Figure 2:
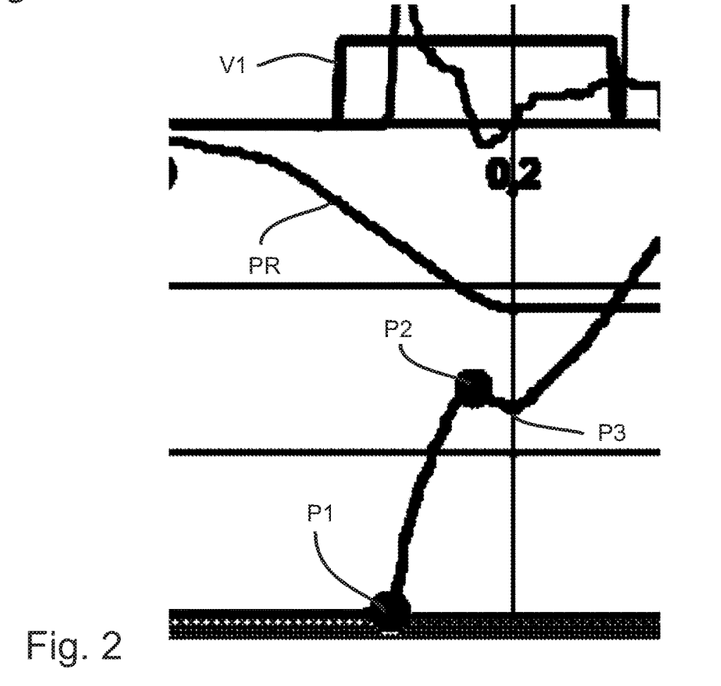
FIG. 2 shows a detailed representation of a measurement curve.

FIG. 2 illustrates the determination of a first process point P1 Start, i.e. the point at which the plastic preforms are applied with the first pressure P1. It can be seen that the valve V1 is switched at a slightly earlier point in time. Advantageously, the point P1 is determined by means of a difference quotient method. By determining or specifying the point P1, the valve delay time of the first valve V1 can be determined. In addition, process values and process experience can also be collected through this point.

Figure 3A:
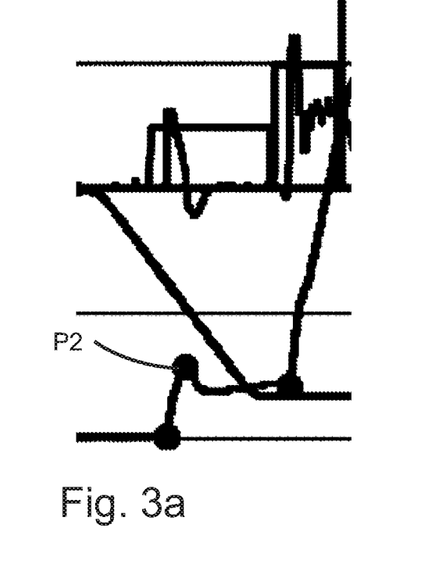
FIG. 3a, 3b show two detailed representations of measurement curves.

FIG. 3a shows the determination of a second process point P2, which represents a local maximum. It is possible to search for the first 0-pass in the difference quotient (the derivative) and thus for P2. Advantageously, an additional median smoothing is carried out here.

Figure 3B:
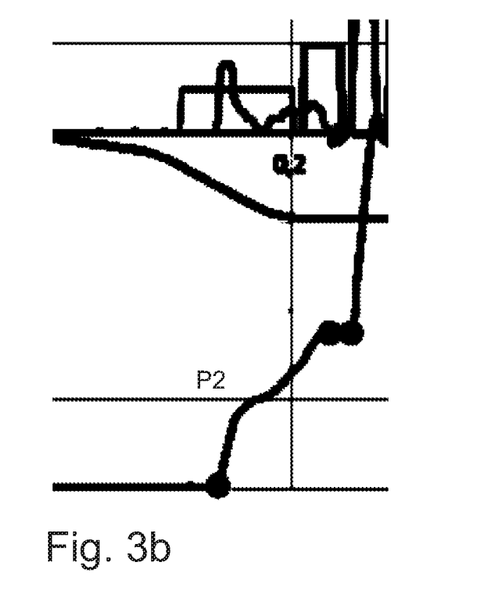

Point P2 defines the point at which the plastic preform starts to flow, i.e. actually starts to expand. FIG. 3b shows a problem case in determining the point P2. In this case, it is possible to specify a range or limit a range in which this point is to be found (for example, in the range limited by a certain maximum slope). It would also be possible to estimate this point or to specify a range of points. Also, the centre of this range could be specified as the point.

The point P3 (cf. FIGS. 4a and 4b) marks a local minimum. The second 0-crossing in the difference quotient (the derivative) after P1 is searched for, wherein a median smoothing can also be carried out here. This point P3 defines the point at which the plastic preform rests against the blow mould and the pressure in the mould rises accordingly.

Figure 4A:
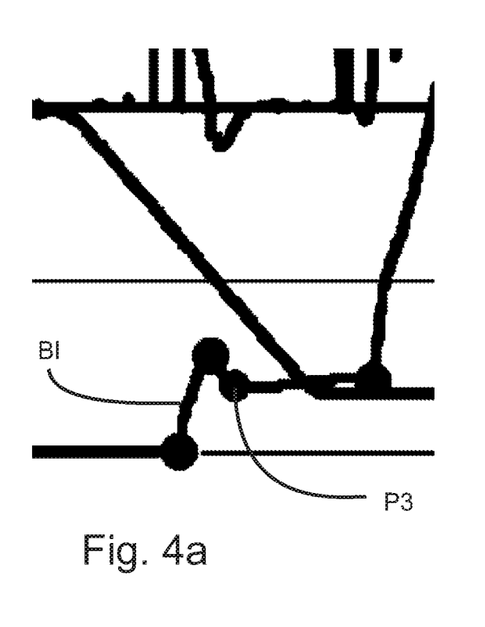
FIG. 4a, 4b show two detailed representations of measurement curves.
Figure 4B:
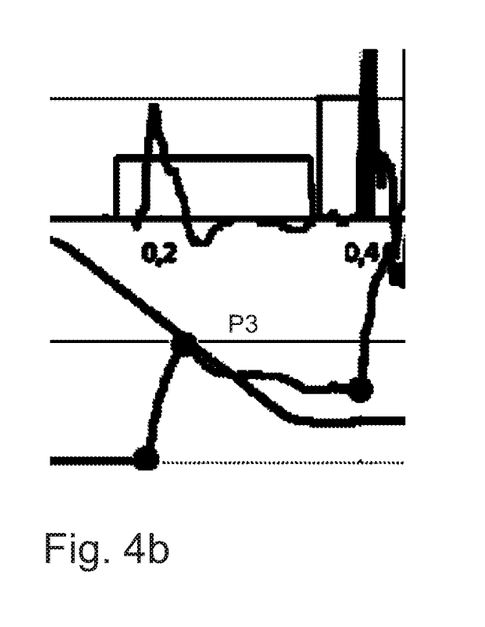
Figure 5A:
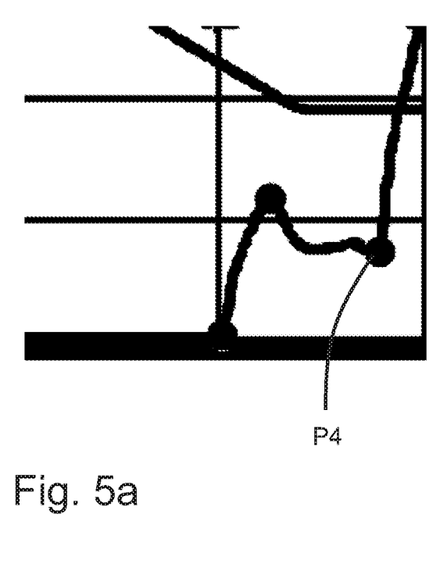
FIGS. 5a-5d show four detailed representations of measurement curves.
Figure 5B:
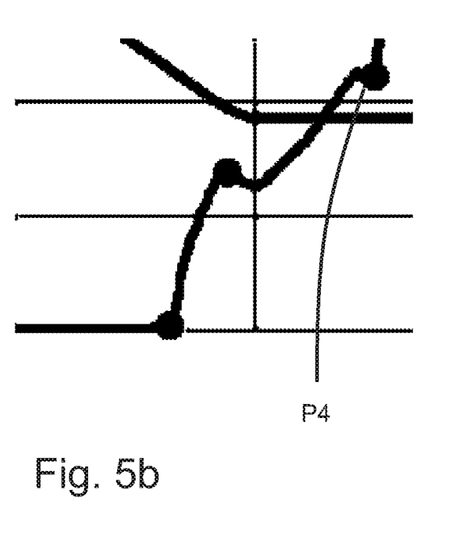
Figure 5C:
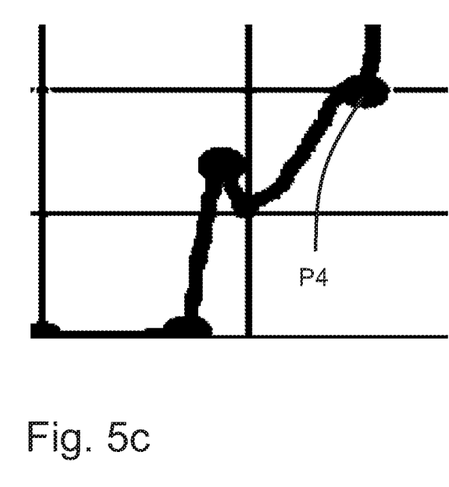
Figure 5D:
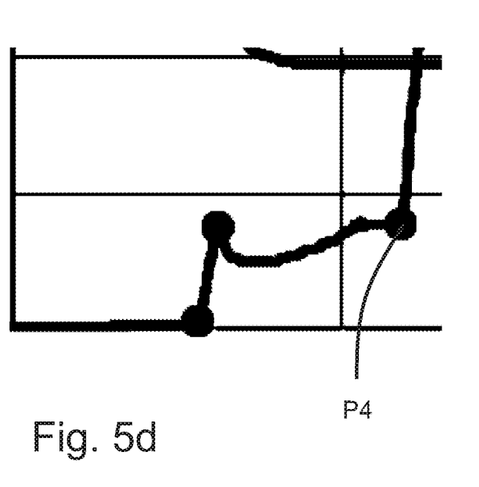

These points P2 and P3 are also used to set blowing parameters and also to gain process experience.

FIGS. 5a to 5d show the determination of a further process point P4 (here the detection of the starting point with the application by the pressure PI). This can also be determined by means of a difference quotient method. In this way, the start of application with a second pressure PI can be detected. Again, it is possible to determine a valve delay time. The blowing parameters can also be set in this way and process values and process experience can again be collected. Preferably, an overflow safety of PI to P1 can be reduced with this procedure.

Figure 6A:
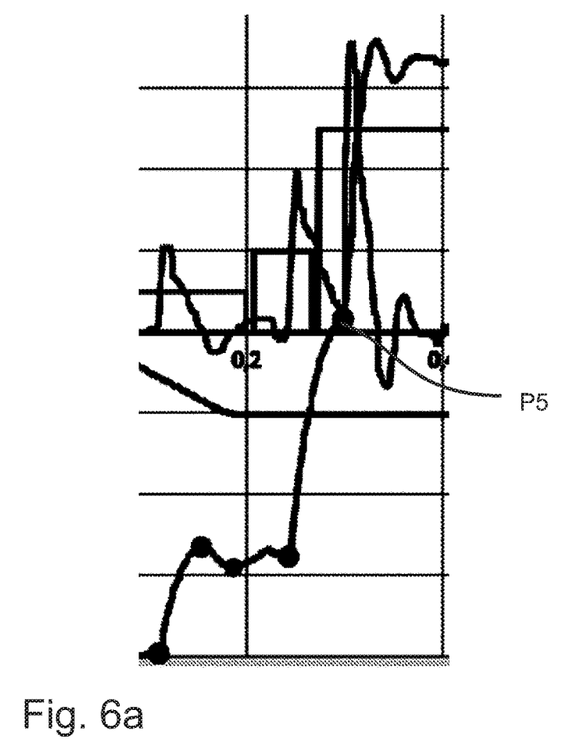
FIGS. 6a-6d show four detailed representations of measurement curves.
Figure 6B:
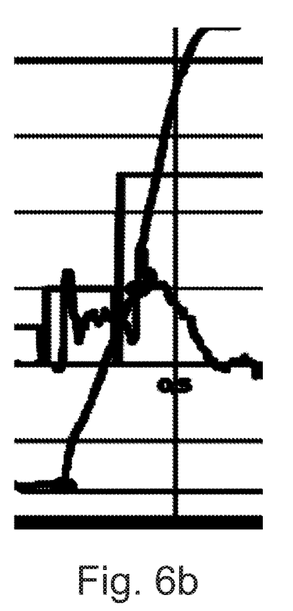
Figure 6C:
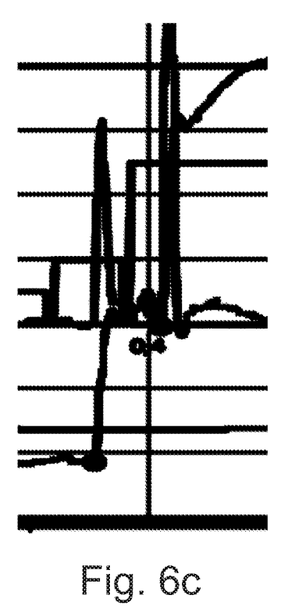
Figure 6D:
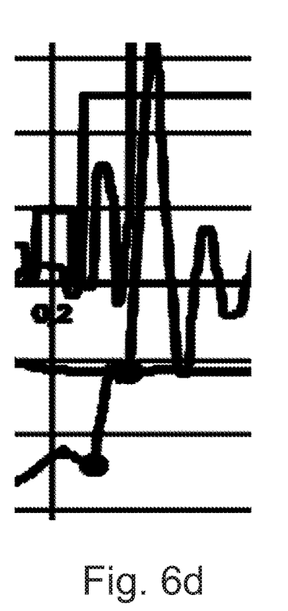

FIG. 6a shows the detection of a further relevant point P5 (here the detection of the start of application with the pressure level PI plus). This can also be done using a difference quotient method. Also in this way a determination of the valve delay time is possible, as well as an adjustment of the blowing parameters. FIGS. 6b, 6c and 6d each show problem situations in which the evaluation of the measurement curves is difficult and, if necessary, areas must also be identified.

In a further preferred method, a first local maximum of the pressure is searched for. It is possible to limit the search to, for example, the area where 95% of a certain pressure, such as the ring channel pressure of the maximum pressure P2, is reached. Then a local maximum of the pressure curve can be searched for. Based on this point, the cooling time can be recorded, i.e. the situation in which the already expanded bottle is completely in contact with the blow mould. The total pressure rise time can also be determined.

Figure 7A:
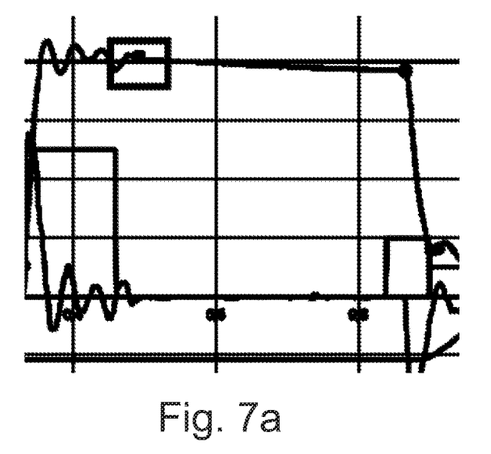
FIG. 7a, 7b show two representations of overall courses.
Figure 7B:
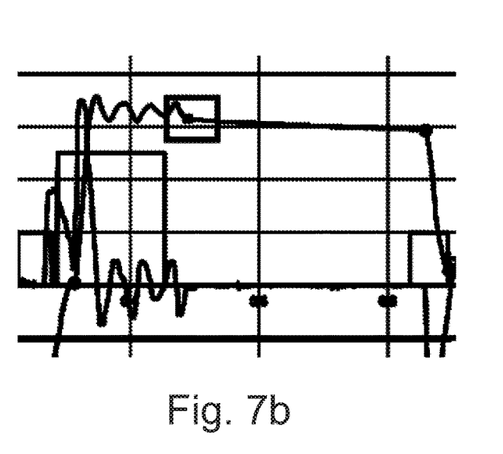
Figure 8A:
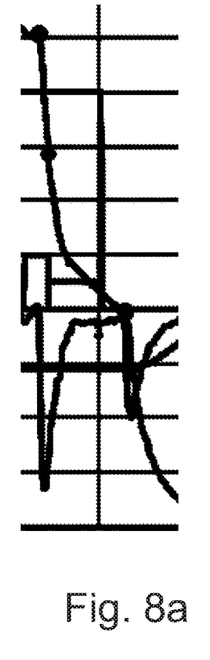
FIGS. 8a-8d show four representations of measurement curves.
Figure 8B:
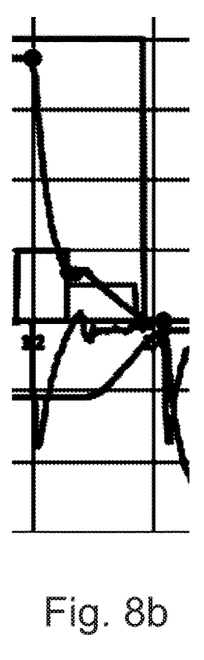
Figure 8C:
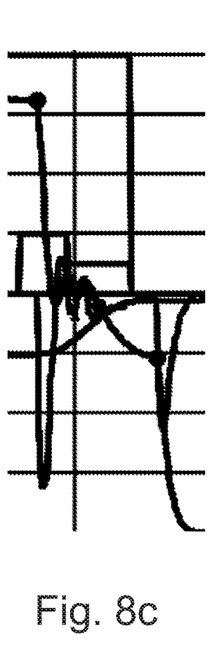
Figure 8D:
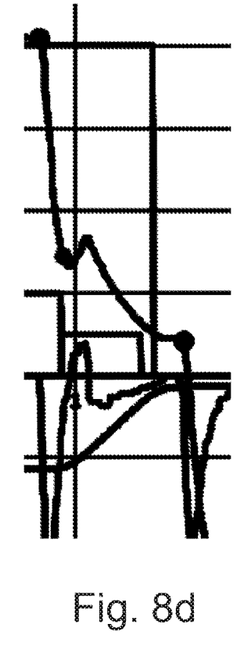
Figure 9A:
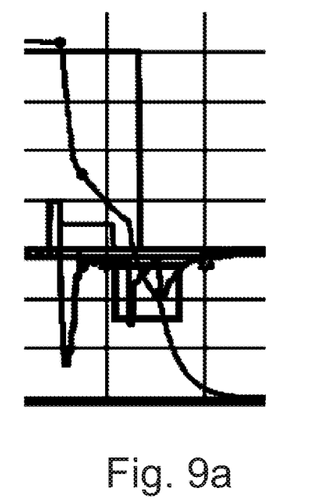
FIGS. 9a-9e show five representations of measurement curves.
Figure 9B:
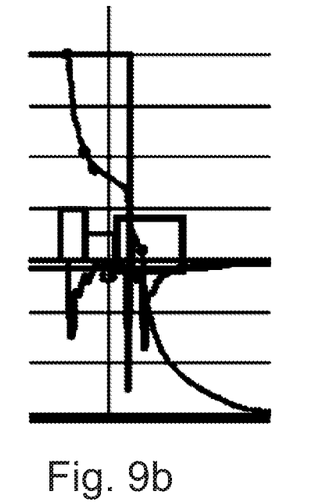
Figure 9C:
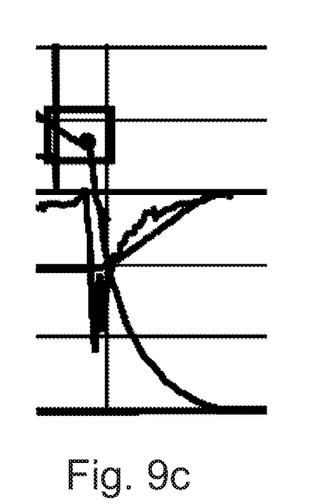
Figure 9D:
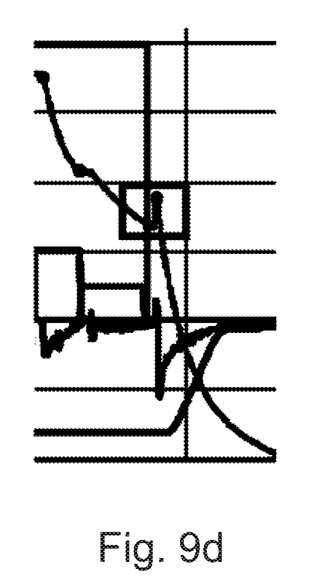
Figure 9E:
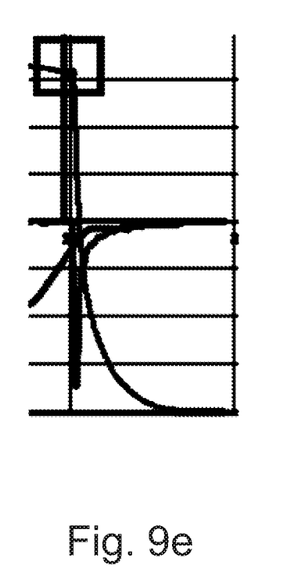

FIGS. 7a and 7b show the determination of the point at which the P2 valve closes. A certain time can be added to the valve delay, for example 60 ms (two times the average valve delay). This point, shown in FIG. 7b, can be used to detect leaks when the pressure drop is too high with a closed P2 valve.

FIGS. 8a to 8d show the detection of relevant points for the start of the recycling of blown air. Again, the search can be done using the difference quotient method. These process points can be used, for example, to reduce air consumption or to set shorter process times.

FIGS. 9a to 9e show five representations of measurement curves in which the start of the air outlet process from the container is determined. Here, too, the respective process points can be determined using the difference quotient method.

The following table shows relevant points of the pressure curve and, if applicable, their significance:

| Process points Pressure curve | Meaning or physical significance |
| --- | --- |
| P1 Start | Effect of opening the P1 valve for pre-blowing pressure |
| P1 Turning point 1 | The plastic of the plastic preform begins to flow or the plastic preform begins to expand |
| P1 Turning point 2 | The plastic preform or its material is in contact with the inner wall of the blow mould. |

-continued

| Process points Pressure curve | Meaning or physical significance |
|---|---|
| PI Start $*_1$ | Effect of opening the PI valve on the pressure curve |
| PI Plus Start $*_1$ | Effect of opening the PI plus valve on the pressure curve |
| P2 Start $*_1$ | Effect of opening the P2 valve on the pressure curve |
| P2 Max $*_3$ | |
| P2 Ende $*_4$ | Effect of closing the P2 - valve for |
| HPZ End $*_1$ | |
| PI Plus Recycling Start | Effect of opening the PI Plus valve for compressed air recycling |
| PI Recycling Start $*_1$ | Effect of opening the PI valve for compressed air recycling |
| P1 Recycling Start $*_1$ | Effect of opening the P1 valve for compressed air recycling |
| External Recycling Start | |
| Exhaust Start $*_1$ | Effect of opening the exhaust valve |
| Exhaust end? | Effect of closing the exhaust valve |

Figure 10:
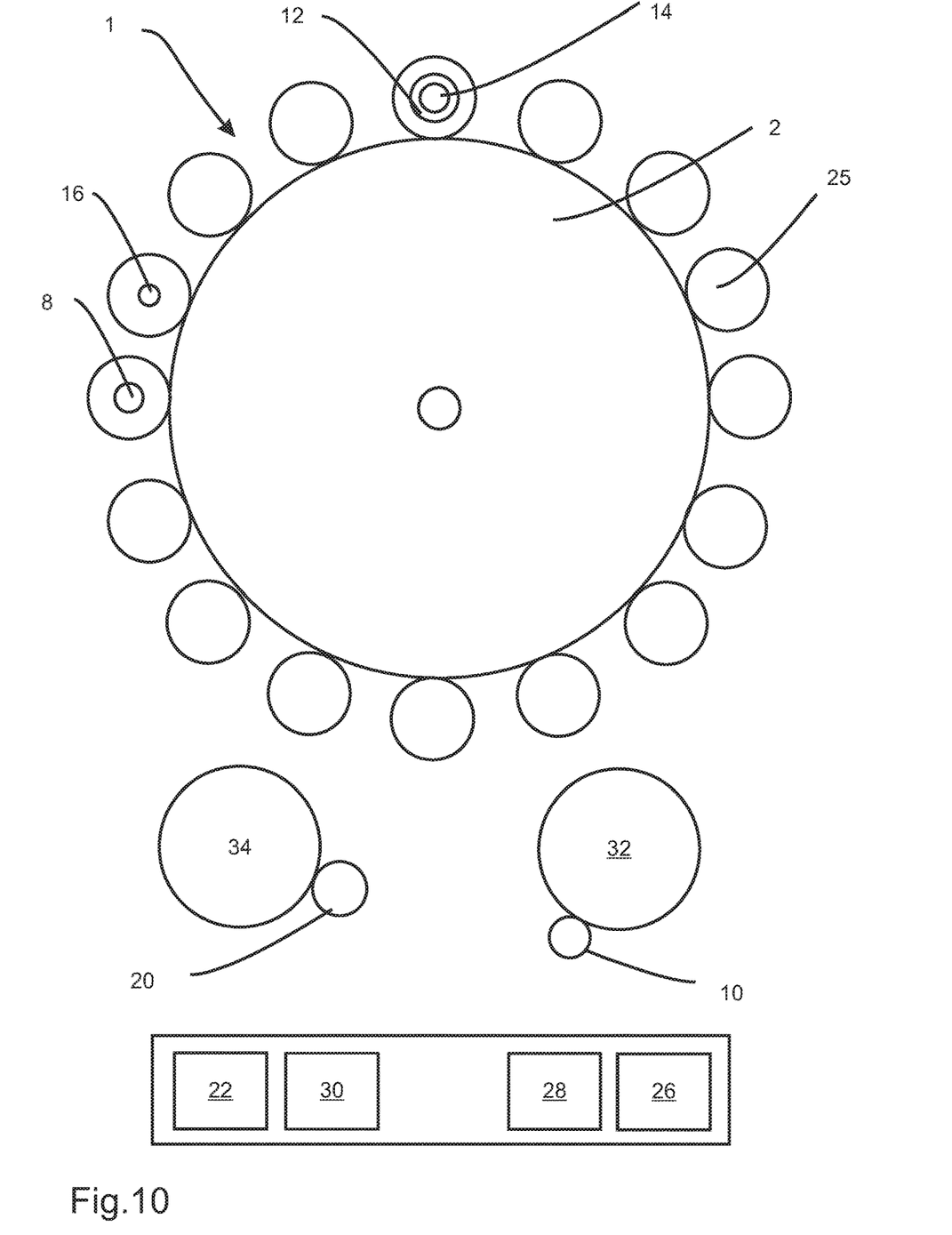
FIG. 10 shows a schematic representation of an apparatus according to the invention.

FIG. 10 shows a roughly schematic representation of an apparatus 1 according to the invention for forming plastic preforms 10 into plastic containers and in particular plastic bottles 20. In particular, the apparatus is a stretch blow-moulding machine. The reference sign 2 indicates a transport device such as a so-called blowing wheel, on which a plurality of forming stations 25 are arranged. These forming stations are preferably designed in the same way or have the same components. For reasons of clarity, however, this is only shown for two forming stations.

The reference sign 32 indicates a feeding device such as a transport starwheel which feeds plastic preforms 10 to the forming device 1 and the reference sign 34 indicates a removal device which removes the blown plastic containers or plastic bottles 20 from the forming device 1.

The forming stations each have an application device 14, such as a blow nozzle, which applies the plastic preforms with compressed air. The reference sign 12 schematically indicates a blow mould within which the plastic preforms are formed.

The reference sign 8 roughly schematically indicates a measuring device, more precisely a pressure detection device, which records the actual (air) pressure (in particular within the containers to be expanded). The reference sign 16 indicates a rod-like body or a stretching bar which stretches the plastic preforms 10 in their longitudinal direction. The pressure curves shown above can be recorded by means of the measuring device The reference sign 26 indicates a smoothing device which smooths the recorded pressure curves or the movement curves. A processor device 22 determines the relevant process points from the course curves, as mentioned above. A control device 28 is used to control the individual valve devices of the forming stations.

The determined process points are stored in a memory device 30.

Figure 11:
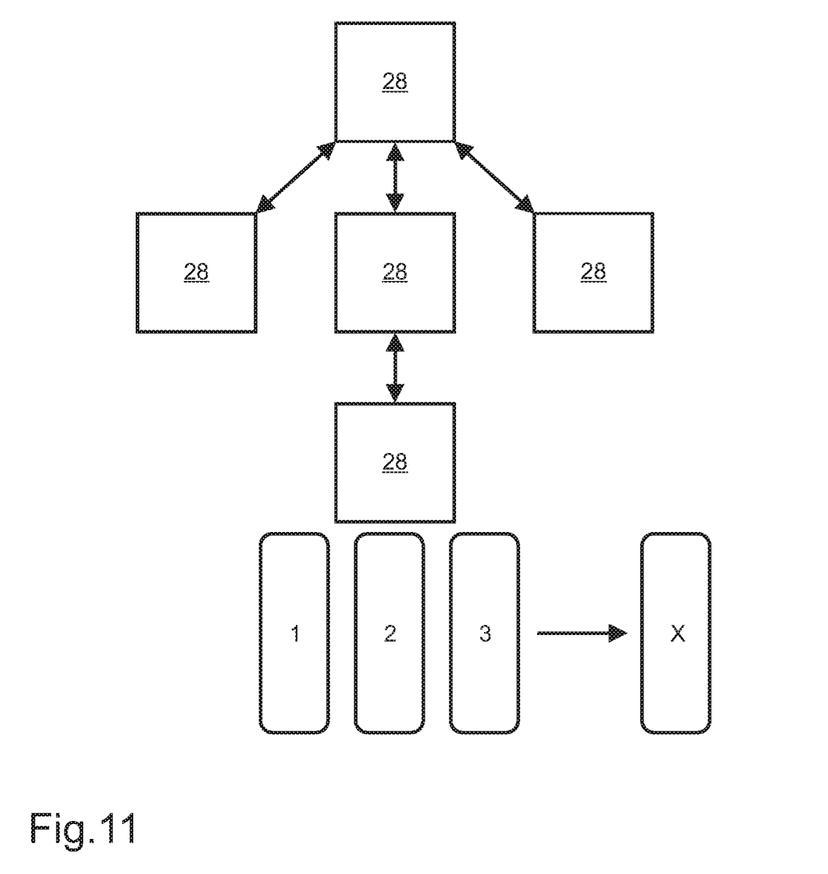
FIG. 11 shows a schematic representation to illustrate the objects of the control device.

FIG. 11 is a schematic representation to illustrate the objects of the control device 28. The control device 28 is preferably a central control unit, in particular for the higher-level control of the blow-moulding machine components.

The control device 28 preferably controls a control device of the blowing machine (SBC) for blowing curve evaluation, in particular the processor device 22 and/or also control devices 24 for the container transport (SDC), for example for the position detection of the containers or the like. The control devices of the blow moulding machine (SBC) are preferably the control of the forming stations $25n$ 1 . . . X, the b ow moulds with valve block and/or the stretching unit.

The control device 28 also controls, for example, a heating device 5 connected upstream of the feed device 32.

Preferably, the control device controls the heating actuators, lamps, heating devices, cooling devices, etc. of the heating device 5.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:

1. A method for forming plastic preforms into plastic containers comprising:
    introducing a plastic preform into a blow mould;
    expanding the plastic preform into a plastic container by applying a flowable medium, wherein the plastic preform is applied by at least two different pressure levels; and
    introducing a stretching bar into the plastic preform to expand the plastic preform in its longitudinal direction, wherein a pressure curve and/or a movement curve of the stretching bar and/or a force curve of the stretching bar is determined by at least one measuring device during the expansion process,
    wherein at least one of the curves is evaluated by a processor device and at least one point or region of this curve, which is characteristic of a course of the curve, is determined,
    wherein a plurality of plastic preforms are formed into the plastic containers by a plurality of forming stations and each forming station is controlled individually taking the at least one point and region into account, and
    wherein data are linked to each point and/or region, which allow conclusions to be drawn about the relevant forming station.

2. The method according to claim 1,
    wherein
    said characteristic point or region is selected from a group of points or regions containing extremes or extreme regions of the pressure curve or movement curve, or turning points or turning point regions of the pressure curve or movement curve.

3. The method according to claim 1,
    wherein
    the plastic preform is transported along a predetermined transport path during its expansion.

4. The method according to claim 1,
wherein
the curve is recorded as a function of time and/or as a function of a position of the plastic preform.

5. The method according to claim 1,
wherein
at least two characteristic points of the course are determined.

6. The method according to claim 1,
wherein
the course curve is evaluated by a curve discussion method.

7. The method according to claim 1,
wherein
at least one characteristic point is determined for each of the forming stations.

8. The method according to claim 1,
wherein
n-tuples are formed from several characteristic points and these n-tuples are stored in a storage device and/or a cloud.

9. The method according to claim 1,
wherein
the pressurisation of the containers is controlled by at least one controllable valve device and this valve device is controlled taking into account the determined points and/or areas.

10. The method according to claim 1,
wherein
characterising data are selected from a group of data consisting of a validity of the point, a time, a pressure at said process point, a position of the stretching bar at said process point, a force of a driving device of the stretching bar at said process point and/or a delay time.

11. An apparatus for forming plastic preforms into plastic containers comprising:
at least one forming station which has a blow mould into which the plastic preform is introduced:
an application device which applies the plastic preform with a flowable medium, wherein the plastic preform is applied with at least two different pressure levels;
a stretching bar which is introduced into the plastic preform to expand the plastic preform in its longitudinal direction, wherein a pressure curve and/or a movement curve of the stretching bar and/or a force curve of the stretching bar is determined by a measuring device during the expansion process;
a processor device which is configured for evaluating at least one of the curves and for determining at least one point or region of the curve, which is characteristic of a course of the curve; and
a plurality of forming stations and a control device controlling the forming stations by taking the at least one point and region into account to form plastic preforms into the plastic containers, wherein
data are linked to each point and/or region, which allow conclusions to be drawn about the relevant forming station.

12. The apparatus according to claim 11,
wherein
the apparatus comprises a storage device and/or a cloud configured for storing a plurality of characteristic points together with data characteristic thereof.

13. The apparatus according to claim 11,
wherein
the apparatus comprises a transport device configured to transport the plastic preforms during their expansion.

* * * * *